United States Patent
Krewer et al.

(10) Patent No.: US 8,771,893 B2
(45) Date of Patent: Jul. 8, 2014

(54) FUEL CELL SYSTEM AND OPERATING METHOD THEREOF

(75) Inventors: Ulrike Krewer, Suwon-si (KR); Jun-Young Park, Suwon-si (KR); Jin-Hwa Lee, Suwon-si (KR); Hye-Jung Cho, Anyang-si (KR); Toshihiko Ichinose, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 938 days.

(21) Appl. No.: 12/199,103

(22) Filed: Aug. 27, 2008

(65) Prior Publication Data

US 2009/0191433 A1 Jul. 30, 2009

(30) Foreign Application Priority Data

Jan. 24, 2008 (KR) .................. 10-2008-0007586

(51) Int. Cl.
*H01M 8/04* (2006.01)

(52) U.S. Cl.
USPC ........................ 429/433; 429/442; 429/429

(58) Field of Classification Search
CPC .......... H01M 8/0432; H01M 8/04223; H01M 8/04694; H01M 8/04701; H01M 8/04731
USPC ........................................ 429/429, 433, 442
See application file for complete search history.

(56) References Cited

U.S. PATENT DOCUMENTS

| | | | |
|---|---|---|---|
| 2002/0132146 A1 * | 9/2002 | Mund | 429/13 |
| 2005/0257969 A1 * | 11/2005 | Osborne et al. | 180/65.3 |
| 2007/0237993 A1 * | 10/2007 | Carlsson et al. | 429/17 |

FOREIGN PATENT DOCUMENTS

| | | | |
|---|---|---|---|
| JP | 2003-510766 | 3/2003 | |
| JP | 2004-288638 | 10/2004 | |
| JP | 2007-035392 | 2/2007 | |
| JP | 2007-042566 | * 2/2007 | H01M 8/04 |

OTHER PUBLICATIONS

KIPO Office action dated Aug. 31, 2010, for priority Korean Patent application 10-2008-0007586.
KIPO Notice of Allowance dated Feb. 28, 2011, for Korean priority Patent application 10-2008-0007586, as well as references previously filed in an IDS dated Sep. 20, 2010.
Patent Abstracts of Japan, and English machine translation of Japanese Publication 2007-035392, 29 pages.

* cited by examiner

*Primary Examiner* — Helen O Conley
(74) *Attorney, Agent, or Firm* — Christie, Parker & Hale, LLP

(57) ABSTRACT

A fuel cell system operating method in which a temperature of a fuel cell power generator is measured when the fuel cell power generator stops generating power, and it is determined whether the temperature is within a predetermined temperature range, and a reverse current is supplied to the fuel cell power generator upon restart if the temperature was determined to be outside of the predetermined range so as to increase the efficiency of the system after restarting the fuel cell power generator after being exposed to extreme conditions. Subsequently, the reverse current supply to the fuel cell power generator stops and electric energy is generated through an electrochemical reaction between hydrogen and oxygen in the fuel cell power generator.

12 Claims, 8 Drawing Sheets

FUEL CELL SYSTEM AND OPERATING METHOD THEREOF

CROSS-REFERENCE TO RELATED APPLICATION

This application claims the benefit of Korean Patent Application No. 2008-7586 filed in the Korean Intellectual Property Office on Jan. 24, 2008, the content of which is incorporated herein by reference.

BACKGROUND OF THE INVENTION

1. Field of the Invention

Aspects of the present invention relate to a fuel cell system. More particularly, aspects of the present invention relate to a fuel cell system in which fuel cell efficiency does not deteriorate in the course of restarting after being left in an extreme environment (i.e., exposed to a high or low temperature) and an operating method thereof.

2. Description of the Related Art

A fuel cell is a power generation device for generating electric energy through an oxidation reaction of a fuel and a reduction reaction of an oxidizing agent. Fuel cells may be of many types, including a polymer electrolyte membrane fuel cell and a direct methanol fuel cell.

A polymer electrolyte fuel cell receives a reforming gas that is reformed from liquid fuel or gas fuel, and an oxidizing gas, such as oxygen. The polymer electrolyte fuel cell generates electric energy through an oxidation reaction of the reforming gas and a reduction reaction of the oxidizing gas. A direct methanol fuel cell receives liquid fuel and air, and generates electric energy through an oxidation reaction of the fuel and a reduction reaction of an oxidizing gas. Since the direct methanol fuel cell has simple constituent elements, it is often used as a portable power supply.

A fuel cell system employing the fuel cell includes a fuel cell power generator for generating electric energy through an electrochemical reaction between hydrogen and oxygen. The fuel cell system further includes a fuel supplier for supplying fuel containing the hydrogen to the fuel cell power generator and an oxidizing agent supplier for supplying an oxidizing gas containing the oxygen to the fuel cell power generator.

However, conventional fuel cell systems have a problem in that fuel cell efficiency is deteriorated in the course of restarting after the systems are left in an extreme environment where the temperature is extremely high or low. Particularly, since direct methanol fuel cells are widely used for portable power supplies, it is more likely that they are exposed such environments; and thus, the fuel cell efficiency deteriorates.

To resolve such problems, one conventional technology suggests a structure of applying a reverse current introduced to the fuel cell power generator. The fuel cell system of the conventional technology quickly recovers the fuel cell efficiency during restarting by supplying a reverse current to a fuel cell power generator even though the fuel cell power generator is left in an extreme environment where the temperature is extremely high or low.

The conventional fuel cell system supplies the reverse current for a time as short as about 18 seconds or up to about 180 seconds. However, it may be possible for the reverse current to be supplied even if the fuel cell system is not left in an extreme environment where the temperature is extremely high or low. As such, the conventional fuel cell system may consume power unnecessarily when it restarts after the fuel cell power generator stops. The above information disclosed in this Background section is only for enhancement of understanding of the background of the invention and therefore it may contain information that does not necessarily form the prior art that is already known in this country to a person of ordinary skill in the art and the above disclosure is not an admission as such.

SUMMARY OF THE INVENTION

Aspects of the present invention provide a fuel cell system having advantages of quickly increasing fuel cell efficiency by supplying a reverse current to a fuel cell power generator in the course of restarting after the fuel cell system is left in an extreme environment where the temperature is extremely high or low, and an operating method thereof.

Aspects of the present invention also provide a fuel cell system that is improved from conventional fuel cell systems to not consume additional power even though a reverse current is supplied to a fuel cell power generator, and an operating method thereof.

According to aspects of the present invention, a fuel cell system includes a fuel cell power generator to generate electric energy through an electrochemical reaction between hydrogen and oxygen; a fuel supplier to supply fuel including the hydrogen to the fuel cell power generator; an oxidizing agent supplier to supply an oxidizing agent including the oxygen to the fuel cell power generator; a power source to supply a reverse current to the fuel cell power generator when the fuel cell power generator is restarted; and a controller to store temperature information detected from the fuel cell power generator when the fuel cell power generator stops generating power and the temperature information is outside of a predetermined temperature range and to control the power source to supply the reverse current to the fuel cell power generator upon restart of the fuel cell power generator for a predetermined time when the temperature information is stored.

According to aspects of the present invention, a method for operating a fuel cell system includes measuring a temperature of a fuel cell power generator when the fuel cell power generator stops generating power and determining whether the temperature is within a predetermined temperature range; supplying a reverse current to the fuel cell power generator according to the determination of whether the temperature is within the predetermined temperature range when the fuel cell power generator is restarted; and stopping the reverse current supply to the fuel cell power generator after a predetermined time and generating electric energy through an electrochemical reaction between hydrogen and oxygen in the fuel cell power generator.

According to aspects of the present invention, a method for operating a fuel cell system includes: storing a temperature of a fuel cell power generator of the fuel cell system while the fuel cell power generator is not generating power if the temperature is outside of a predetermined range; supplying a reverse current to the fuel cell power generator upon starting of the fuel cell power generator if the temperature is stored.

According to aspects of the present invention, a method for operating a fuel cell system includes supplying a reverse current to a fuel cell power generator upon starting of the fuel cell power generator if a temperature of the fuel cell power generator before the starting is outside of a predetermined range.

According to aspects of the present invention, a fuel cell system includes a fuel cell generator, a fuel supplier, an oxidizing agent supplier, and a power source. According to aspects of the present invention, the fuel cell generator generates electric energy through an electrochemical reaction between hydrogen and oxygen. According to aspects of the present invention, the fuel supplier supplies fuel including hydrogen to the fuel cell power generator, and the oxidizing agent supplier supplies an oxidizing gas including oxygen to the fuel cell power generator. According to aspects of the present invention, the power source supplies a reverse current to the fuel cell power generator when the fuel cell power generator is restarted.

According to aspects of the present invention, the fuel cell system may further include a controller to store temperature information detected from the fuel cell power generator when the fuel cell power generator stops generating power and to control the power source to supply a reverse current to the fuel cell power generator based on the temperature information.

According to aspects of the present invention, the fuel cell system may further include a first power switch disposed between the fuel cell power generator and the power source and to selectively supply power provided from the power source. According to aspects of the present invention, the first power switch may turn an electric circuit on or off based on a contact point scheme. According to aspects of the present invention, the power source may be one of a battery and/or a capacitor.

According to aspects of the present invention, the power source may be a power converter to boost voltage of the electric energy generated in the fuel cell power generator through an electrochemical reaction, and to supply the boosted electric energy to an external load. According to aspects of the present invention, the power converter may change a power flow according to a control signal of the controller when the fuel cell power generator is restarted. According to aspects of the present invention, the power source may include a first power circuit to convert the electric energy generated by the fuel cell power generator through the electrochemical reaction and to transmit the converted electric energy to an external load, and a second power circuit connected in parallel to the first power circuit and to supply external power to the fuel cell power generator when the fuel cell power generator is restarted after stopping power generation.

According to aspects of the present invention, the second power circuit may supply the external power from any one of a battery and a capacitor to the fuel cell power generator.

According to aspects of the present invention, the power source may further include a second power switch to control power flow toward the first power circuit by to selectively supply the electric energy, and a third power switch to control power flow toward the second power circuit by selectively supplying the external power.

According to aspects of the present invention, a method for operating a fuel cell system is provided in which the temperature of a fuel cell power generator is measured when the fuel cell power generator stops generating power, and it is determined whether the temperature is in a predetermined temperature range. According to aspects of the present invention, a reverse current is supplied to the fuel cell power generator based on the temperature information of the fuel cell power generator when the fuel cell power generator is restarted. According to aspects of the present invention, the reverse current supply to the fuel cell power generator stops and electric energy is generated through an electrochemical reaction between hydrogen and oxygen in the fuel cell power generator.

According to aspects of the present invention, the temperature of the fuel cell power generator may be measured periodically at predetermined time intervals while the fuel cell power generator stops generating power and stores temperature information of the fuel cell power generator in a controller. According to aspects of the present invention, the temperature range used in the temperature determination step may be lower than about 10° C. or higher than about 60° C. According to aspects of the present invention, the controller may read the temperature information of the fuel cell power generator and supply the reverse current from a power source to the fuel cell power generator.

The fuel cell system and operating method thereof, according to aspects of the present invention, improves fuel cell efficiency by applying a reverse current in the course of restarting the fuel cell power generator. In addition, the fuel cell system and operating method thereof, according to aspects of the present invention, is economical because it includes a structure for selectively applying a reverse current in an extreme environment where the temperature is extremely high or low and thus does not consume more power than conventional fuel cell systems.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
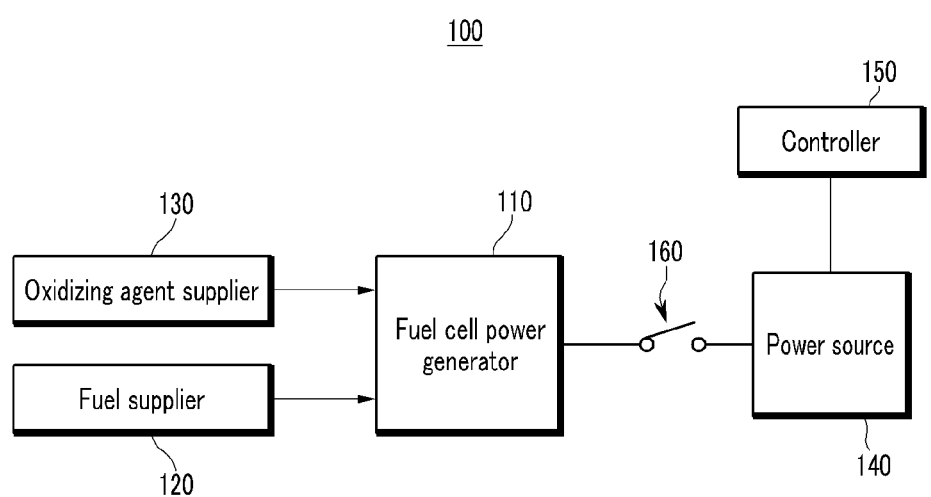
FIG. 1 is a block view showing constituent elements of a fuel cell system according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

FIG. 1 is a block view showing a fuel cell system 100 according to an exemplary embodiment of the present invention. As shown in FIG. 1, the fuel cell system 100 includes a power source 140 for supplying a reverse current to a fuel cell power generator 110 under a condition in which the fuel cell power generator 110 restarts a power generation operation. Particularly, the fuel cell system 100 is improved to supply a reverse current to the fuel cell power generator 110 only when the fuel cell system 100 is left in an extreme environment where the temperature is extremely high or low. Thus, the fuel cell system 100 consumes less power than conventional fuel cell systems, while improving power generation efficiency of the fuel cell power generator 110.

The fuel cell system 100 further includes a fuel supplier 120, and an oxidizing agent supplier 130. The fuel cell power generator 110 generates electric energy through an electrochemical reaction between fuel containing hydrogen supplied by the fuel supplier 120 and an oxidizing agent containing oxygen supplied by the oxidizing agent supplier 130. The fuel cell power generator 110 has a structure in which unit cells, each of which is the minimal unit for generating electric energy, are stacked consecutively. Generally, such a fuel cell power generator 110 is called a fuel cell stack. The fuel cell power generator 110 is a stack of multiple unit cells arranged consecutively, and end plates are disposed at the outermost sides of the stack. However, a number of unit cells is not limited and can be a single unit cell.

The fuel supplier 120 includes a fuel tank for containing the fuel and a pump for supplying the fuel to the fuel cell power generator 110. While not required in all aspects, the fuel supplier 120 may further include a reformer for reforming the fuel according to the fueling method of the fuel cell power generator 110, or the fuel supplier 120 may be of a structure for directly supplying the fuel to the fuel cell power generator 110.

The oxidizing agent supplier 130 supplies an oxidizing gas to the fuel cell power generator 110. The oxidizing agent supplier 130 is generally an air pump, and the oxidizing agent supplier 130 supplies air in the atmosphere to the fuel cell power generator 110 as an oxidizing gas. However, the oxidizing agent supplier 130 is not so limited, such as when compressed air is supplied.

The fuel cell system 100 generates electric energy for a predetermined period and is then left in a power generation suspension mode. If the fuel cell system 100 is a portable power generator, such as a direct methanol fuel cell, there is a high probability that the fuel cell system 100 may be left in an extreme environment where the temperature is extremely high or low. Thus, there is a problem in that the fuel cell power generation efficiency is reduced and the electrochemical reaction does not occur smoothly in the fuel cell power generator 110 even though the fuel and the oxidizing gas are supplied to the fuel cell power generator 110 when the fuel cell power generator 110 of the fuel cell system 100 is restarted. To overcome such problem, the fuel cell system 100 includes the power source 140 for supplying a reverse current to the fuel cell power generator 110 when the fuel cell power generator 110 is restarted.

While not specifically limited, the power source 140 may be a battery, a capacitor, or any other portable power source, and the power source 140 provides power of a predetermined capacitance. Alternatively, the power source 140 may include or be a plug, such as when the fuel cell system 100 is plugged into an outlet through which power is supplied by an external source.

A controller 150 controls the power source 140 to supply a reverse current to the fuel cell power generator 110. Herein, the controller 150 receives and stores temperature information acquired from thermosensors attached to the fuel cell power generator 110, the fuel supplier 120, and the oxidizing agent supplier 130 when the fuel cell power generator 110 is in the power generation suspension mode. However, such thermosensors can be otherwise dispose and need not be connected to each or all of such units, and can also be disposed on a housing of the fuel cell system 100 or connected to the fuel cell system 100 wirelessly and/or through wired connections. The controller 150 controls the power source 140 based on the temperature information to supply a reverse current to the fuel cell power generator 110, when the constituent elements are left in an extreme environment where the temperature is extremely high or low, and particularly when the fuel cell power generator 110 is left in the extreme environment. The thermosensor may be a thermometer, thermister, thermocouple, or the like, but is not limited thereto.

A first power switch 160 is disposed between the fuel cell power generator 110 and the power source 140 to selectively supply power provided from the power source 140 to the fuel cell power generator 110. While not required in all aspects, the shown first power switch 160 is a switch that turns an electric circuit on or off in a contact point scheme. Then, the first power switch 160 is maintained in a switch-off mode while the fuel cell power generator 110 is in a power generation mode or a power generation suspension mode; and when the fuel cell power generator 110 is restarted, the first power switch 160 is turned on.

Figure 2:
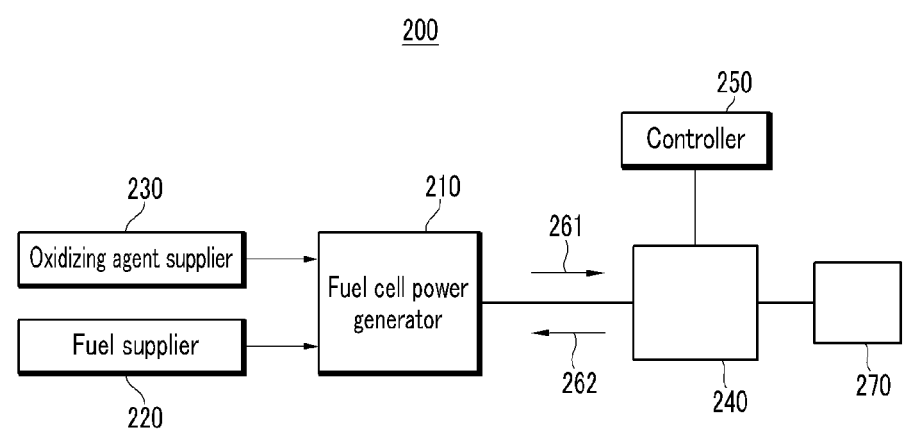
FIG. 2 is a block view showing constituent elements of a fuel cell system according to an exemplary embodiment of the present invention.

FIG. 2 is a block view showing a fuel cell system 200 according to an exemplary embodiment of the present invention. As shown in FIG. 2, the fuel cell system 200 includes a power source 240 similar to the fuel cell system 100 of FIG. 1; but here, the power source 240 is a power converter.

A fuel cell power generator 210 receives fuel containing hydrogen from a fuel supplier 220 and an oxidizing gas containing oxygen from an oxidizing agent supplier 230. Then, the fuel cell power generator 210 generates electric energy through an electrochemical reaction between the hydrogen and the oxygen and supplies the electric energy to be used as a power source for an external load 270 (e.g., such as a computer, vehicle, or other device utilizing the generated energy). Generally, the voltage of the electric energy generated in the fuel cell power generator 210 is boosted to a predetermined value to be used as a direct current (DC) power source for the external load 270, or the electric energy is converted into alternating current (AC). For the voltage boosting, the fuel cell system 200 includes the power source 240, which is a power converter for boosting the direct current to the predetermined value.

The power source 240 maintains a first power flow 261 to provide power to the external load 270 while the fuel cell power generator 210 generates power. The power source 240 changes the flow of power according to a control signal of a controller 250. The power source 240 maintains a second power flow 262 to provide external power to the fuel cell power generator 210 when the fuel cell power generator 210 is restarted.

Figure 3:
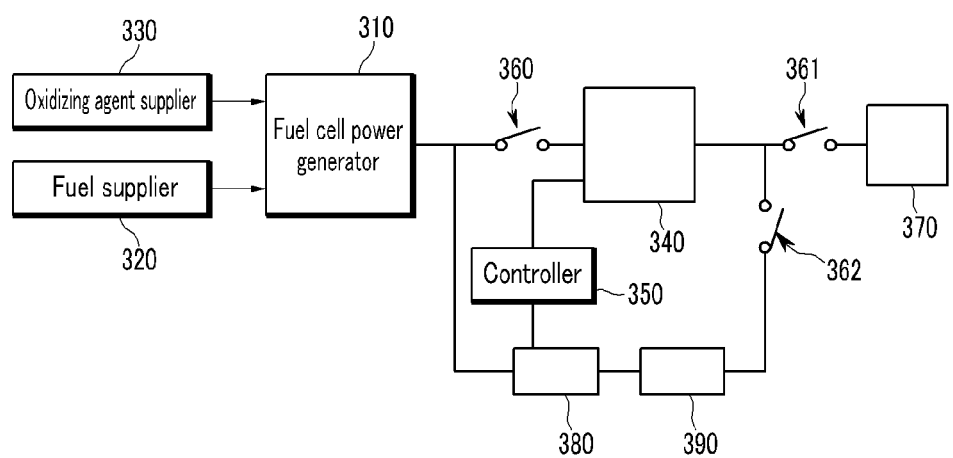
FIG. 3 is a block view showing constituent elements of a fuel cell system according to an exemplary embodiment of the present invention.

FIG. 3 is a block view showing constituent elements of a fuel cell system 300 according to an exemplary embodiment of the present invention. As shown in FIG. 3, the fuel cell system 300 includes a first power circuit 340 for converting electric energy generated in a fuel cell power generator 310 and providing the converted electric energy to an external load 370. The fuel cell system 300 includes a second power circuit 380 for supplying external power to the fuel cell power generator 310 in a reverse direction for a predetermined period under a condition in which the fuel cell power generator 310 stops generating power and then restarts its operation. The fuel cell system 300 also converts power and provides the electric energy generated in the fuel cell power generator 310 to the external load 370 and supplies external power in a reverse direction while the fuel cell power generator 310 is restarted. The fuel cell system 300 further includes a controller 350 to control at least the fuel cell power generator 310 and the first and second power circuits 340 and 380.

To be specific, the fuel cell power generator 310 receives fuel containing hydrogen from a fuel supplier 320 and an oxidizing gas containing oxygen from an oxidizing agent supplier 330. Then, the fuel cell power generator 310 generates direct current through an electrochemical reaction between the hydrogen and the oxygen. The first power circuit 340 boosts the direct current to a predetermined value or converts the direct current into alternating current to be used as a power source for an external load 370. The second power circuit 380 is connected in parallel with the first power circuit 340 between the fuel cell power generator 310 and the external load 370. The second power circuit 380 supplies external power to the fuel cell power generator 310 when the fuel cell power generator 310 stops generating power and then restarts operation. The external power is supplied from a power supply 390, which may be a battery or a capacitor, and the power supply 390 is connected in series with the second power circuit 380 and in parallel to the first power circuit 340. The power supply 390 may be internal to the fuel cell system 300 or may be external to the system 300.

Power flow in the fuel cell system 300 when the fuel cell power generator 310 generates power is different from the power flow when the fuel cell power generator 310 that has stopped generating power restarts operation. The fuel cell system 300 includes power switches to direct the power flow.

Second power switches 360 and 361 are disposed between the fuel cell power generator 310 and the first power circuit 340 and between the first power circuit 340 and the external load 370, respectively. The second power switches 360 and 361 are switches for turning an electric circuit on or off based on a contact point scheme. The second power switches 360 and 361 maintain their turned-on state when the fuel cell power generator 310 generates electric power and are turned off when the fuel cell power generator 310 that has stopped generating power is restarted.

A third power switch 362 is disposed in a circuit line in series with the second power circuit 380 and the power supply 390 and in parallel with the first power circuit 340, and the third power switch 362 may be disposed in series with and on either side of the second power circuit 380. The third power switch 362 switches an electric circuit based on a contact point scheme. Then, the third power switch 362 maintains its turned-off state while the fuel cell power generator 310 generates power so that the electric energy does not flow to the second power circuit 380. The third power switch 362 is turned on when the fuel cell power generator 310 that has stopped generating power is restarted. Thus, the external power from the power supply 390 is supplied to the fuel cell power generator 310 through the second power circuit 380 in a reverse direction. The switches 360, 361, and 362 may be controlled by the controller 350, or through separate processors and/or sensors at the switches 360, 361, and 362.

Figure 4:
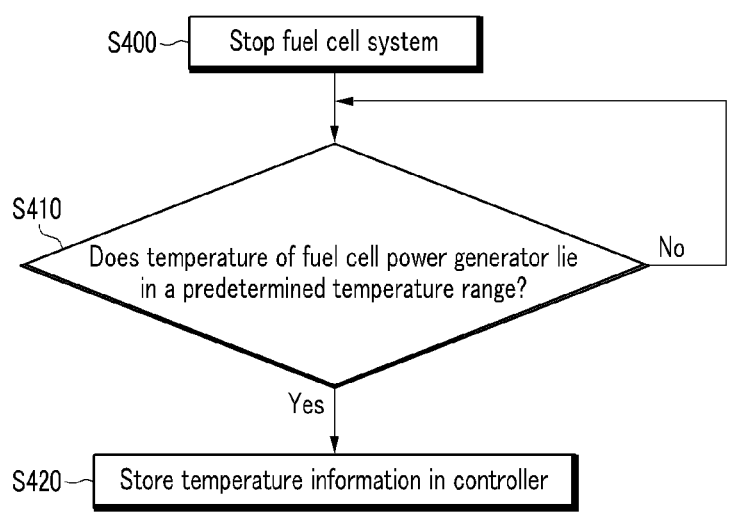
FIG. 4 is a flowchart describing a method for operating the fuel cell system shown in FIGS. 1 through 3 and shows operations at each step when the fuel cell system stops generating power.

FIG. 4 is a flowchart describing a method for operating the fuel cell systems 100, 200, and 300 shown in FIGS. 1 through 3. According to a fuel cell system operating method described in FIG. 4, when the fuel cell system is stopped in operation S400, the temperature of a fuel cell power generator 110, 210, or 310 is measured and it is determined whether the measured temperature lies within a predetermined temperature range in operation S410. In other words, sensors in a fuel cell power generator 110, 210, or 310 individually measure temperature at predetermined time intervals while the fuel cell systems 100, 200, or 300, including the fuel cell power generator 110, 210, or 310, is not generating power. Temperature information of the fuel cell power generator 110, 210, or 310 acquired in the sensors is stored in the controller 150, 250, or 350 in operation S410. If the temperature is within the predetermined range, the method returns to the operation S410 for a next temperature sensing. However, it is understood that the temperature could still be stored in other aspects, but that the method would still be returned to operation S410 to determine whether the temperature remains in the predetermined temperature range.

By way of a non-limiting example, the temperature range used in the temperature determination, outside of which is considered an extreme temperature condition, may be set to about 10° C. to about 60° C. According to the fuel cell system operating method, if the temperature is outside of the predetermined range, then the temperature information of the fuel cell power generator 110, 210, or 310 is stored in a memory of the controller in operation S420. When the temperature of the fuel cell power generator 110, 210, or 310 is lower than 10° C., particles of fuel or an oxidizing gas may be inactive or frozen so that it is difficult to induce an electrochemical reaction. In contrast, when the temperature of the fuel cell power generator 110, 210, or 310 exceeds about 60° C., power generation performance is deteriorated due to a degradation effect.

Figure 5:
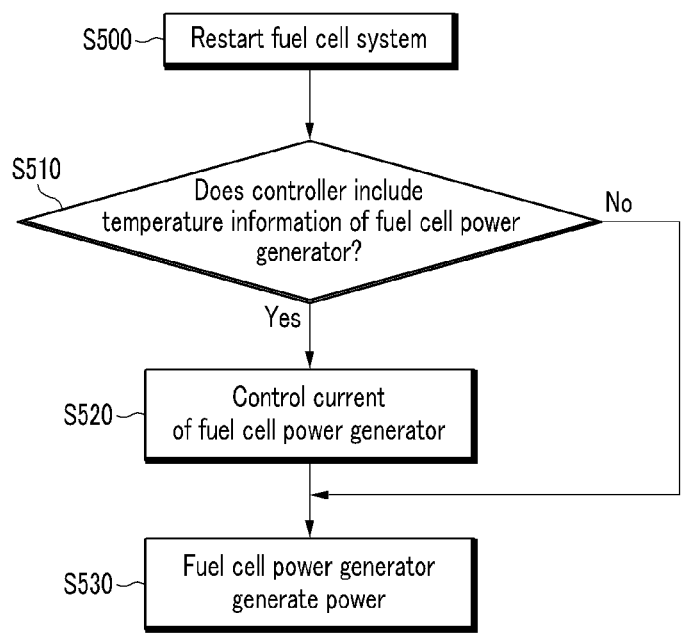
FIG. 5 is a flowchart describing a method for operating the fuel cell system shown in FIGS. 1 through 3, and shows operations at each step when the fuel cell system restarts its operation.

FIG. 5 is a flowchart describing a method for operating the fuel cell systems 100, 200, and 300 shown in FIGS. 1 through 3.

As shown in FIGS. 4 and 5, the fuel cell system 100, 200, or 300 is operated as follows when the fuel cell system including the fuel cell power generator 110, 210, or 310 is restarted in operation S500 after the fuel cell power generator 110, 210, or 310 is stopped. It is determined in operation S510 whether the fuel cell power generator 110, 210, or 310 is left in an extreme environment where the temperature is lower than about 10° C. or higher than about 60° C. by reading the temperature information of the fuel cell power generator 110, 210, or 310 that is stored in a controller 150, 250, or 350 according to aspects of the present invention as illustrated in FIG. 4.

When the fuel cell power generator 110, 210, or 310 is not left in such an extreme environment, the fuel cell power generator 110, 210, or 310 is restarted normally in operation S530, i.e., if the controller 150, 250, or 350 does not include temperature information of the fuel cell power generator 110, 210, or 310, the fuel cell power generator 110, 210, or 310 is started normally. Otherwise, when the fuel cell power generator 110, 210, or 310 is left in the extreme environment, a reverse current is supplied to the fuel cell power generator 110, 210, or 310 in operation S520, i.e., if the controller 150, 250, or 350 does include temperature information of the fuel cell power generator 110, 210, or 310 as determined in operation S510, the reverse current is applied to the fuel cell power generator 110, 210, or 310 as described above. When the reverse current is supplied according to aspects shown in FIG. 1, a power source 140, such as a battery or a capacitor, is controlled to supply a reverse current from the power source 140 to the fuel cell power generator 110. Also, when the reverse current is supplied according to aspects shown in FIG. 2, the power flow of a power source 240 is changed to supply a reverse current to the fuel cell power generator 210. Further, when the reverse current is supplied according to aspects shown in FIG. 3, the power flow of power supply 390 and the second power circuit 380 are applied to the fuel cell power generator 310 according to the states of the switches 360, 361, and 362.

After the reverse current is supplied for a predetermined time, the supply of the reverse current is stopped and the fuel cell power generator 110, 210, or 310 is restarted in operation S530. According to the fuel cell system operating method, the fuel cell efficiency can be rapidly recovered in the course of restarting the fuel cell power generator 110, 210, or 310 by executing power generation in which electric energy is generated through an electrochemical reaction between hydrogen and oxygen in the fuel cell power generator 110, 210, or 310.

Such improvement in the fuel cell efficiency in the course of restarting the fuel cell power generator 110, 210, or 310 according to the fuel cell system operating method was proven through experiments, which will be described hereinafter.

Figure 6:
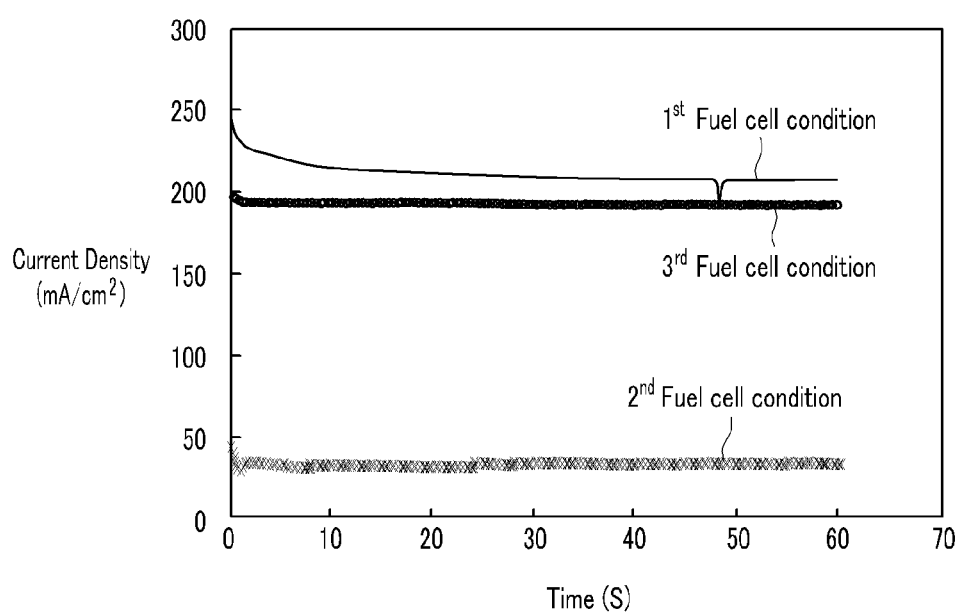
FIG. 6 is a data graph showing fuel cell efficiency measured while the fuel cell system of FIG. 1 is restarted.

FIG. 6 is a data graph showing fuel cell efficiency measured while of the fuel cell system 100 of FIG. 1 was restarted. The data graph shown in FIG. 6 shows an experimental result acquired by measuring electric energy generated in a fuel cell power generator 110 having a cell voltage of 0.45V and using 4 mol of methanol ($CH_3OH$) as a fuel through a direct methanol fuel cell method. According to a first fuel cell condition, current density was measured under normal temperatures, i.e., not extreme conditions and before the fuel cell system was left at temperatures of about −10° C. According to a second fuel cell condition, current density was measured after the fuel cell system 100 was left in extreme conditions at a temperature of about −10° C. and then operation thereof was restarted. According to a third fuel cell condition, current density was measured after supplying a reverse current while the fuel cell system 100 was left in extreme conditions at a temperature of about −10° C. and then operation thereof was restarted. The current density of the second fuel cell condition was about 84% lower than the current density of the first fuel cell condition; whereas the current density of the third fuel cell condition was about 9% lower than that of the first fuel cell condition.

Figure 7:
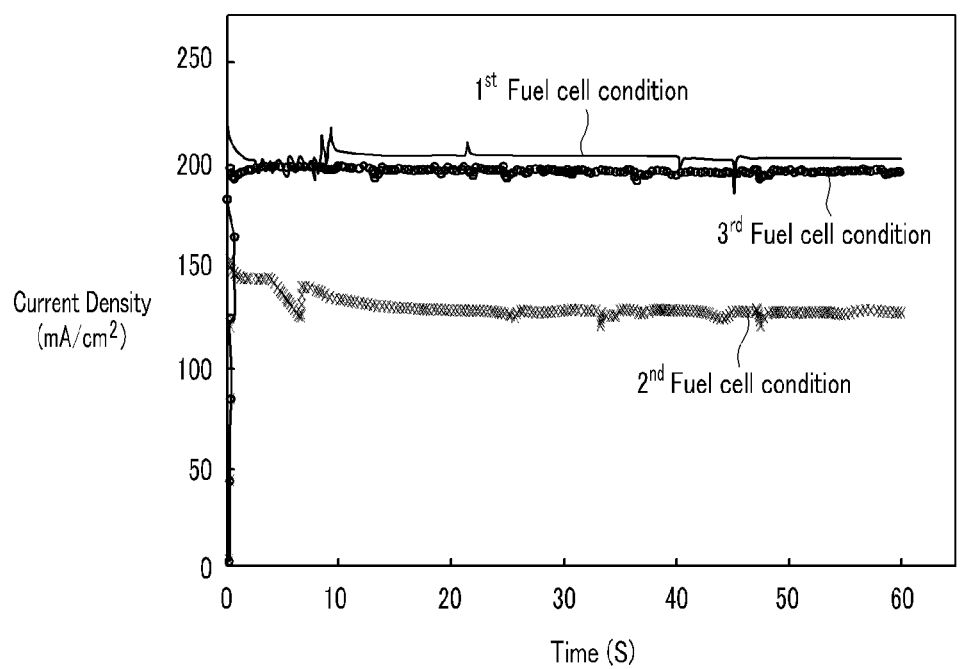
FIG. 7 is a data graph showing fuel cell efficiency measured while the fuel cell system of FIG. 2 is restarted.

FIG. 7 is a data graph showing fuel cell efficiency measured while the fuel cell system 200 of FIG. 2 was restarted. The data graph of FIG. 7 shows an experimental result acquired by measuring electric energy generated in a fuel cell power generator 210 that is different from the fuel cell power generator 110 of FIG. 6. According to a first fuel cell condition, current density was measured under normal temperatures, i.e., not extreme conditions and before the fuel cell system 200 was left in extreme conditions at temperatures of about −10° C. According to a second fuel cell condition, current density was measured after the fuel cell system 200 was left in extreme conditions at a temperature of about −10° C. and then operation thereof was restarted. According to a third fuel cell condition, current density was measured after a reverse current was supplied when the fuel cell system 200 was left in extreme conditions at a temperature of about −10° C. and then operation thereof was restarted. The current density of the second fuel cell condition was about 36% lower than the current density of the first fuel cell condition on average. On the other hand, the current density of the third fuel cell condition was increased dramatically within a few initial seconds and maintained at a level about 3% lower than the current density of the first fuel cell condition.

Figure 8:
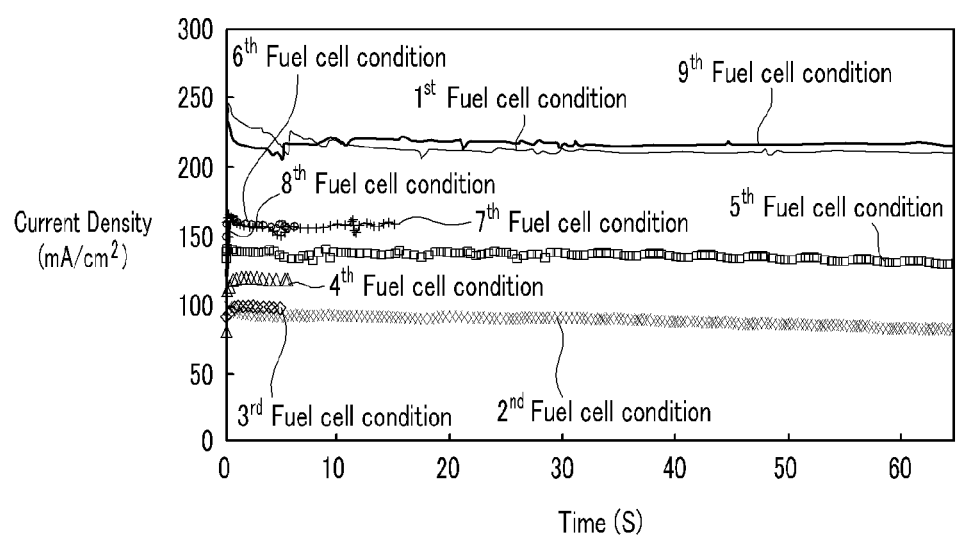
FIG. 8 is a data graph showing fuel cell efficiency measured while the fuel cell system of FIG. 3 is restarted.

FIG. 8 is a data graph showing fuel cell efficiency measured while the fuel cell system 300 of FIG. 3 was restarted. The data graph shown in FIG. 8 shows an experimental result of applying diverse methods to improve fuel cell efficiency in the course of restarting a fuel cell power generator 310. In the experiment, the fuel was 4 mol of methanol ($CH_3OH$), and electric energy generated in a fuel cell power generator 310 through a direct methanol fuel cell method was measured. According to a first fuel cell condition, current density was measured under normal temperatures, i.e., not extreme conditions and before the fuel cell system 300 was left in extreme conditions at a temperature of about 60° C. According to a second fuel cell condition, current density was measured after the fuel cell system was left in extreme conditions at a temperature of about 60° C. and then operation thereof was restarted. The current density of the second fuel cell condition was about 57% lower than the current density of the first fuel cell condition. The fuel cell efficiency of the second fuel cell condition was deteriorated so as to be very low.

Third to eighth fuel cell conditions were experimental conditions applying diverse methods to recover fuel cell efficiency after the fuel cell system was left in extreme conditions at a temperature of about 60° C. and then operation thereof was restarted. According to the third fuel cell condition, current density was measured after air purging was performed on a cathode for about 10 minutes. According to the fourth and fifth fuel cell conditions, current densities were measured by supplying fuel from an anode and an oxidizing gas from a cathode at different ratios to the fuel cell power generator 310 for about 30 minutes. According to the sixth and seventh fuel cell conditions, current densities were measured after cell voltage sweeping was performed for about 30 minutes. According to the eighth fuel cell condition, current density was measured after performing air purging on the anode for about 10 minutes. It was shown that the third to eighth fuel cell conditions increased the current densities with respect to the second fuel cell condition. However, the current densities of the conditions remained much lower than that of the first fuel cell condition, and this signifies that the third to eighth fuel cell conditions failed in improving the fuel cell efficiency of a fuel cell exposed to extreme conditions.

According to a ninth fuel cell condition, a reverse current of about 6.5 A was supplied for about 10 seconds when the fuel cell system 300 was left in the in extreme conditions at a temperature of about 60° C. and then restarted. The result was that the current density of the ninth fuel cell condition was improved to be similar to or about 1% higher than the current density of the first fuel cell condition, i.e., when the current density was measured after restart under not extreme conditions.

While not required in all aspects, elements of the methods described above can be implemented using computer software and/or firmware implemented by one or more processors and/or computers, which may be included in the controller 150, 250, or 350.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A fuel cell system, comprising:
  a fuel cell power generator configured to generate electric energy through an electrochemical reaction between hydrogen and oxygen;
  a fuel supplier configured to selectively supply fuel including the hydrogen to the fuel cell power generator;
  an oxidizing agent supplier configured to supply an oxidizing agent including the oxygen to the fuel cell power generator;
  a power source configured to supply a reverse current to the fuel cell power generator when the fuel cell power generator is restarted; and
  a controller configured to store temperature information detected from the fuel cell power generator when the fuel cell power generator stops generating power and configured to control the power source to selectively supply the reverse current to the fuel cell power generator according to the stored temperature information, such that, when the stored temperature information indicates a temperature greater than a temperature range, the power source supplies the reverse current to the fuel cell power generator while the fuel cell power generator is restarted and stops supplying the reverse current to the fuel cell power generator while the fuel cell power generator is generating power.

2. The fuel cell system of claim 1, further comprising:
a first power switch disposed between the fuel cell power generator and the power source configured to selectively supply power from the power source to the fuel cell power generator, the first power switch being controlled by the controller.

3. The fuel cell system of claim 2, wherein the first power switch is configured to turn an electric circuit on or off based on a contact point scheme.

4. The fuel cell system of claim 1, wherein the power source comprises a battery and/or a capacitor.

5. The fuel cell system of claim 1, wherein the power source comprises a power converter configured to boost voltage of the electric energy generated in the fuel cell power generator through an electrochemical reaction and to supply the boosted voltage to an external load, and
the power converter is configured to control a power flow according to a control signal of the controller when the fuel cell power generator is restarted.

6. The fuel cell system of claim 1 wherein the power source comprises:
a first power circuit configured to convert the electric energy generated by the fuel cell power generator through the electrochemical reaction and to transmit the converted electric energy to an external load; and
a second power circuit connected in parallel to the first power circuit configured to supply external power to the fuel cell power generator when the fuel cell power generator is restarted.

7. The fuel cell system of claim 6, wherein the second power circuit is configured to supply the external power to the fuel cell power generator from a battery and/or a capacitor disposed in series with the second power circuit and in parallel with the first power circuit.

8. The fuel cell system of claim 7, wherein the battery and/or the capacitor are disposed in series with the second power circuit and in parallel with the first power circuit.

9. The fuel cell system of claim 6, wherein further comprising:
a first power switch configured to selectively control power flow toward the first power circuit by selectively supplying the electric energy from the fuel cell power generator to the first power circuit, the first power switch being controlled by the controller; and
a second power switch configured to selectively control power flow from the second power circuit to the fuel cell power generator, the second power switch being controlled by the controller.

10. The fuel cell system of claim 9, further comprising:
a third power switch configured to selectively control power flow from the fuel cell power generator to the external load, the third power switch being controlled by the controller.

11. The fuel cell system of claim 1, wherein the controller is configured to store the temperature information if the temperature information is outside of a predetermined temperature range and to supply the reverse current to the fuel cell power generator upon restart of the fuel cell power generator for a predetermined time.

12. The fuel cell system of claim 1, wherein an upper limit of the temperature range is 60° C.

* * * * *